United States Patent
Mori et al.

(10) Patent No.: US 9,845,714 B2
(45) Date of Patent: Dec. 19, 2017

(54) ELECTRICALLY-HEATED CATALYTIC CONVERTER

(71) Applicant: TOYOTA JIDOSHA KABUSHIKI KAISHA, Toyota-shi, Aichi-ken (JP)

(72) Inventors: Rentaro Mori, Kasugai (JP); Sumio Kamiya, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 134 days.

(21) Appl. No.: 15/080,244

(22) Filed: Mar. 24, 2016

(65) Prior Publication Data

US 2016/0281570 A1 Sep. 29, 2016

(30) Foreign Application Priority Data

Mar. 27, 2015 (JP) .................. 2015-066869

(51) Int. Cl.
*B01D 50/00* (2006.01)
*F01N 3/20* (2006.01)
*F01N 13/16* (2010.01)

(52) U.S. Cl.
CPC ......... *F01N 3/2026* (2013.01); *F01N 3/2013* (2013.01); *F01N 13/16* (2013.01); *F01N 2260/10* (2013.01); *F01N 2330/06* (2013.01); *Y02T 10/26* (2013.01)

(58) Field of Classification Search
CPC .. F01N 3/2013; F01N 3/2026; F01N 2260/10; F01N 2230/06; F01N 13/16; Y02T 10/26
USPC ............... 422/174, 177, 180; 219/443.1, 541
See application file for complete search history.

(56) References Cited

U.S. PATENT DOCUMENTS

| | | | |
|---|---|---|---|
| 5,902,557 A * | 5/1999 | Yotsuya | B01J 35/0033 422/171 |
| 6,060,699 A * | 5/2000 | Sakurai | F01N 3/2013 219/205 |
| 7,696,455 B2 | 4/2010 | Lin et al. | |

(Continued)

FOREIGN PATENT DOCUMENTS

| JP | 2009-535785 A | 10/2009 |
|---|---|---|
| JP | 2011212577 A | 10/2011 |

(Continued)

*Primary Examiner* — Tom P Duong
(74) *Attorney, Agent, or Firm* — Sughrue Mion, PLLC

(57) ABSTRACT

An electrically-heated catalytic converter includes: a substrate made of ceramic, the substrate including a catalyst coated layer; electrode films made of ceramic, the electrode films being disposed on a surface of the substrate; electrode terminals made of ceramic, each of the electrode terminals being secured to a corresponding one of the electrode films; and external electrodes each attached to a corresponding one of the electrode terminals via a brazing filler metal. A thermal expansion coefficient of the brazing filler metal is equal to or higher than a thermal expansion coefficient of the electrode terminals, and is equal to or lower than a thermal expansion coefficient of the external electrodes. The thermal expansion coefficient of each of the electrode terminals decreases from a portion at which the electrode terminal is joined to the brazing filler metal toward a portion at which the electrode terminal is joined to the corresponding electrode film.

20 Claims, 5 Drawing Sheets

(56) References Cited

U.S. PATENT DOCUMENTS

| | | | | |
|---|---|---|---|---|
| 2002/0185485 A1* | 12/2002 | Radmacher | ......... | B29C 66/0044 |
| | | | | 219/243 |
| 2010/0308849 A1* | 12/2010 | Bouteiller | ............. | F01N 3/0222 |
| | | | | 324/700 |
| 2012/0011834 A1* | 1/2012 | Sobue | ................... | F01N 3/2013 |
| | | | | 60/300 |
| 2012/0076699 A1* | 3/2012 | Ishihara | ............... | B01J 19/2485 |
| | | | | 422/174 |
| 2013/0224080 A1 | 8/2013 | Ishihara et al. | | |
| 2013/0259754 A1 | 10/2013 | Murata et al. | | |
| 2013/0287378 A1* | 10/2013 | Kida | ...................... | H05B 3/141 |
| | | | | 392/465 |
| 2015/0083316 A1* | 3/2015 | Shirai | ................... | C04B 37/021 |
| | | | | 156/272.2 |

FOREIGN PATENT DOCUMENTS

| | | |
|---|---|---|
| JP | 5246352 B2 | 7/2013 |
| JP | 2013-198887 A | 10/2013 |
| JP | 2014155884 A | 8/2014 |

\* cited by examiner

ELECTRICALLY-HEATED CATALYTIC CONVERTER

CROSS-REFERENCE TO RELATED APPLICATIONS

This application claims priority from Japanese Patent Application No. 2015-066869, filed on Mar. 27, 2015 in the Japanese Patent Office, the disclosure of which, including the specification, drawings and abstract is incorporated herein by reference in its entirety.

BACKGROUND

1. Field

Apparatuses and methods consistent with the exemplary embodiments relate to an electrically-heated catalytic converter disposed in an exhaust system for exhaust gas.

2. Description of Related Art

In various industrial fields, various efforts are underway on a worldwide scale to reduce environmental impacts and environmental loads. In the field of the automobile industry, the widespread use of not only gasoline engine vehicles with high fuel efficiency performance but also so-called eco-friendly vehicles, such as hybrid vehicles and electric automobiles, has been promoted, and the development focused on further enhancement of the performance of such vehicles has been advanced.

An exhaust system for exhaust gas, which is configured to connect a vehicle engine to a muffler, may be provided with an electrically-heated catalytic converter (EHC) configured to clean exhaust gas under normal temperatures, and, in addition, to clean exhaust gas by activating a catalyst as quickly as possible through electric heating under cold environment. The electrically-heated catalytic converter has a configuration in which, for example, a pair of electrodes is attached to a honeycomb catalyst disposed in the exhaust system for exhaust gas and these electrodes are connected to each other via an external circuit provided with an electric power source. In the electrically-heated catalytic converter, the honeycomb catalyst is heated by supplying electric current to the electrode to increase the activity of the honeycomb catalyst. In this way, the electrically-heated catalytic converter removes toxic substance in exhaust gas passing therethrough.

The electrically-heated catalytic converter typically includes an outer pipe (metal case), a substrate having a honeycomb structure and a heat-generating property, an insulating mat (holding member), a pair of electrodes, and an external circuit. The outer pipe has a hollow space. The substrate is disposed in the hollow space of the outer pipe, and has catalyst coated layers. The insulating mat is interposed between the outer pipe and the substrate. Each of the electrodes is attached to a surface of the substrate, in a region where the mat is not disposed. The external circuit connects the electrodes to each other. A honeycomb structural body having such a configuration is described in Japanese Patent Application Publication No. 2013-198887 (JP 2013-198887 A).

Specifically, electrode films for diffusing electric currents throughout the substrate as evenly as possible are disposed at portions of the surface of the substrate where the electrodes are disposed. The electrically-heated catalytic converter has a configuration in which electrode terminals are attached to the surface of the substrate through openings provided in the electrode films. External electrodes (lead terminals) are attached to the electrode terminals via brazing filler metals, and a cable leading to the electric power source constitutes the external circuit. Alternatively, the electrode terminals may be attached to the surfaces of the electrode films without providing openings in the electrode films.

As described above, the components of the electrically-heated catalytic converter include the substrate supporting catalysts and having a honeycomb structure, the electrode films disposed on the surface of the substrate, the electrode terminals disposed on the surfaces of the electrode films, and the external circuit. Examples of the substrate are roughly classified into metal substrates and ceramic substrates. It is a known fact that it is difficult to use metal substrates in hybrid vehicles (HV) and plug-in hybrid vehicles (PHV) because the resistance is too low. For this reason, electrically-heated catalytic converters including ceramic substrates, which are usable in the eco-friendly vehicles, are becoming the mainstream.

The electrode films, the electrode terminals, and the substrate having a honeycomb structure, which constitute the electrically-heated catalytic converter, are required to have the following actions and functions.

Each electrode film is required to have a function as a current collector, and it is thus desirable that each electrode film have a lower volume resistivity than that of the substrate. Further, each electrode film is required to have an electric current diffusion function with which even supply of electric current throughout the substrate is promoted, and it is thus desirable that each electrode film be configured to adjust the flow of electric current so as to diffuse the electric current throughout the substrate as evenly as possible. Each electrode film is attached to the surface of the substrate, and it is thus desirable that a joint interface at which the electrode film is attached to the substrate have a strength against thermal stress, which is equal to or higher than that of the substrate. For this reason, it is desirable that the strength of connection between each electrode film and the substrate be high, and in addition, the thermal expansion coefficient of the substrate and that of each electrode film be approximately equal to each other to minimize the difference in thermal deformation between each electrode film and the substrate. Furthermore, in view of resistance to thermal shock, it is desirable that each electrode film have a thermal conductivity equal to or higher than that of the substrate. From the viewpoint of maintaining the reliability for environment resistance, it is desirable that variations in the volume resistance of each electrode film under the high-temperature oxidation atmosphere be small. The above-described actions and functions required of each electrode film are also required of the electrode terminals.

It is desirable that the substrate, which is a heating element having a honeycomb structure, be configured such that the resistance value can be controlled to the optimal resistance value depending on the intended use, and the current and voltage applied to the substrate. Further, it is desirable that the temperature dependence of the resistance be low and variations in the resistance value be small within a temperature range from −30° C. to 1000° C., which is a usage temperature range of the catalyst. Further, it is desirable that the substrate have high oxidation resistance and high thermal shock resistance, and, in addition, the substrate be configured so as to be easily joined to the electrode films and the electrode terminals.

In the electrically-heated catalytic converter in the related art in which the substrate provided with the electrode films, the electrode terminals, and the external electrodes are secured to each other as described above, the generated thermal stress varies among these components due to a difference in thermal expansion coefficient among these components. For example, the thermal expansion coefficient of a SiC/Si-based substrate is $4\times10^{-6}/°$ C. to $5\times10^{-6}/°$ C., the thermal expansion coefficient of a SiC/Si-based or MoSi$_2$-based electrode terminal is $4\times10^{-6}/°$ C. to $6\times10^{-6}/°$ C., the thermal expansion coefficient of a Ni-based brazing filler metal is $14\times10^{-6}/°$ C. to $15\times10^{-6}/°$ C., and the thermal expansion coefficient of an external electrode made of 20Cr-5Al Steel-Use-Stainless is $11\times10^{-6}/°$ C. to $12\times10^{-6}/°$ C. Hereinafter, 20Cr-5Al Steel-Use-Stainless will be referred to as SUS (20Cr-5Al) where appropriate. Similarly, other kinds of Steel-Use-Stainless will be denoted by their abbreviated names where appropriate. Note that SUS is a standard of stainless steel that is defined by Japanese Industrial Standards (JIS).

There is a significant difference in thermal expansion coefficient particularly between the electrode terminal and the brazing filler metal. This causes a possibility that damages, such as a crack, will occur at an interface between the electrode terminal and the brazing filler metal due to a difference in thermal stress between the electrode terminal and the brazing filler metal. Damages to the interface result in a decrease in the reliability for the electric connection performance.

SUMMARY

Exemplary embodiments provide an electrically-heated catalytic converter configured to reduce the occurrence of damages to an interface between components of the electrically-heated catalytic converter due to a difference in thermal expansion coefficient between the components.

According to an exemplary embodiment, an electrically-heated catalytic converter includes, a substrate made of ceramic that includes catalyst coated layer; electrode films made of ceramic that is disposed on a surface of the substrate; electrode terminals made of ceramic, each of the electrode terminals being secured to a corresponding one of the electrode films; and external electrodes each attached to a corresponding one of the electrode terminals via a brazing filler metal. A thermal expansion coefficient of the brazing filler metal is equal to or higher than a thermal expansion coefficient of the electrode terminals, and is equal to or lower than a thermal expansion coefficient of the external electrodes, and the thermal expansion coefficient of each of the electrode terminals decreases from a portion at which the electrode terminal is joined to the brazing filler metal toward a portion at which the electrode terminal is joined to the corresponding electrode film.

In a typical electrically-heated catalytic converter including a ceramic substrate provided with electrode films, ceramic electrode terminals, brazing filler metal, and metal external electrodes, the thermal expansion coefficient increases in the order of the substrate, the electrode terminals, the brazing filler metal, and the external electrodes. The electrically-heated catalytic converter according to an exemplary embodiment has a configuration in which the thermal expansion coefficient of each electrode terminal is varied so as to decrease from the portion at which the electrode terminal is joined to the brazing filler metal toward the portion at which the electrode terminal is joined to the corresponding electrode film. Due to such a configuration in which the thermal expansion coefficient is varied in the electrode terminal, it is possible to minimize the difference between the thermal expansion coefficient of the electrode terminal at the portion at which the electrode terminal is joined to the electrode film and the thermal expansion coefficient of the electrode film, and it is also possible to minimize the difference between the thermal expansion coefficient of the electrode terminal at the portion at which the electrode terminal is joined to the brazing filler metal and the thermal expansion coefficient of the brazing filler metal. As a result, it is possible to reduce the occurrence of damages to an interface between the components of the electrically-heated catalytic converter due to a difference in thermal expansion coefficient between the components.

The ceramic substrate may be a porous substrate having electrical conductivity and a heat-generating property and including a plurality of holes in, for example, a triangular shape, a quadrangular shape, or a hexagonal shape. Such a substrate is generally called a honeycomb structural body. Catalyst coated layers are formed on the surfaces of multiple cells of the substrate. In each catalyst coated layer, a precious metal catalyst, such as platinum or palladium, is supported on an oxide support, such as alumina. Examples of the substrate include a substrate formed as a single-piece member, and a substrate formed by joining a plurality of segments with a joining material.

As ceramic materials for the substrate, the electrode films, and the electrode terminals, SiC, a composite material of SiC and Si, a composite material of SiC and MoSi$_2$, or a composite material of MoSi$_2$ and Si may be employed.

Examples of the electrode terminal in which the thermal expansion coefficient decreases from the brazing filler metal side toward the electrode film side include an electrode terminal in which the thermal expansion coefficient is gradually varied, and electrode terminals having a multilayer structure, such as a two-layer structure or a three-layer structure, in which the thermal expansion coefficient is varied among the layers. In an exemplary embodiment, the electrode terminal in which the thermal expansion coefficient is gradually varied may be produced in the following manner. For example, a certain kind of base powder is vibrationally compacted. Then, another kind of base powder is added to the compacted base powder, and the mixture is vibrationally compacted. Then, sintering is performed such that the first layer and the second layer are mixed.

In the above aspect, in the thermal expansion coefficient of each of the electrode terminals, the thermal expansion coefficient of the portion at which the electrode terminal may be joined to the brazing filler metal is $6\times10^{-6}/°$ C. to $9\times10^{-6}/°$ C.; the thermal expansion coefficient of the brazing filler metal may be $7\times10^{-6}/°$ C. to $10\times10^{-6}/°$ C.; and the thermal expansion coefficient of the external electrodes may be $9\times10^{-6}/°$ C. to $12\times10^{-6}/°$ C.

In the above aspect, a difference between the thermal expansion coefficient of the portion at which the electrode terminal may be joined to the brazing filler metal and the thermal expansion coefficient of the brazing filler metal may be $2\times10^{-6}$ or less; and a difference between the thermal expansion coefficient of the brazing filler metal and the thermal expansion coefficient of the external electrodes may be $2\times10^{-6}$ or less. With this configuration, it is possible to effectively reduce the occurrence of damages to an interface between the components of the electrically-heated catalytic converter. The difference in thermal expansion coefficient between the adjacent components may be $1\times10^{-6}$ or less.

In the above aspect, the brazing filler metal may be a Ti-based brazing filler metal; and a thermal expansion coefficient of the Ti-based brazing filler metal may be $9\times10^{-6}/°$ C. to $10\times10^{-6}/°$ C.

Examples of the Ti-based brazing filler metal include a brazing filler metal composed of a material that contains Ti as a basic component and further contains, for example, Cu, Ni, Zr, Cr, or Al, and a clad-type Ti-based brazing filler metal in which an outer layer made of, for example, Ni or Cu is formed on the surface of a Ti main layer. When the external electrode is made of SUS, the wettability with respect to the external electrode becomes favorable due to the outermost layer made of the Ni material. Further, the internal stress is relaxed due to the Cu layer having a low Young's modulus.

When the Ti-based brazing filler metal and the ceramic electrode terminal are joined together, the electrode terminal is impregnated with the brazing filler metal. Thus, an interface layer is formed at the interface between the brazing filler metal and the electrode terminal. The interface layer has a thermal expansion coefficient intermediate between the thermal expansion coefficient of the brazing filler metal and the thermal expansion coefficient of the electrode terminal at a portion on the brazing filler metal side. As a result, it is possible to reduce the occurrence of damages to the interface due to the difference in thermal expansion coefficient between the brazing filler metal and the electrode terminal.

The inventors examined brazability of various brazing filler metals with respect to the electrode terminal and the external electrode, more specifically, brazability of each of a Ni-based brazing filler metal, a Ag-based brazing filler metal, an activated Ag-based brazing filler metal, a Ti-based brazing filler metal, and a Po-based brazing filler metal. The results of examination prove that the Ti-based brazing filler metal has favorable brazability with respect to both the ceramic electrode terminal and the external electrode made of, for example, SUS.

In the above aspect, each of the electrode terminals may have a multi-layer structure including a plurality of layers that are different from each other in thermal expansion coefficient. In the above aspect, the external electrodes may be made of 19Cr-2Mo Steel-Use-Stainless or 20Cr-5Al Steel-Use-Stainless.

As can be understood from the above description, in the electrically-heated catalytic converter according to an exemplary embodiment, the thermal expansion coefficient of the electrode terminal is varied such that the thermal expansion coefficient decreases from the portion at which the electrode terminal is joined to the brazing filler metal toward the portion at which the electrode terminal is joined to the electrode film. This makes it possible to reduce the occurrence of damages to an interface between components of the electrically-heated catalytic converter due to a difference in thermal expansion coefficient between the components. Therefore, according to an exemplary embodiment, an electrically-heated catalytic converter having high reliability for the electric connection performance is provided.

BRIEF DESCRIPTION OF THE DRAWINGS

Features, advantages, and technical and industrial significance of exemplary embodiments o will be described below with reference to the accompanying drawings, in which like numerals denote like elements, and wherein.

DETAILED DESCRIPTION OF EMBODIMENTS

Figure 1:
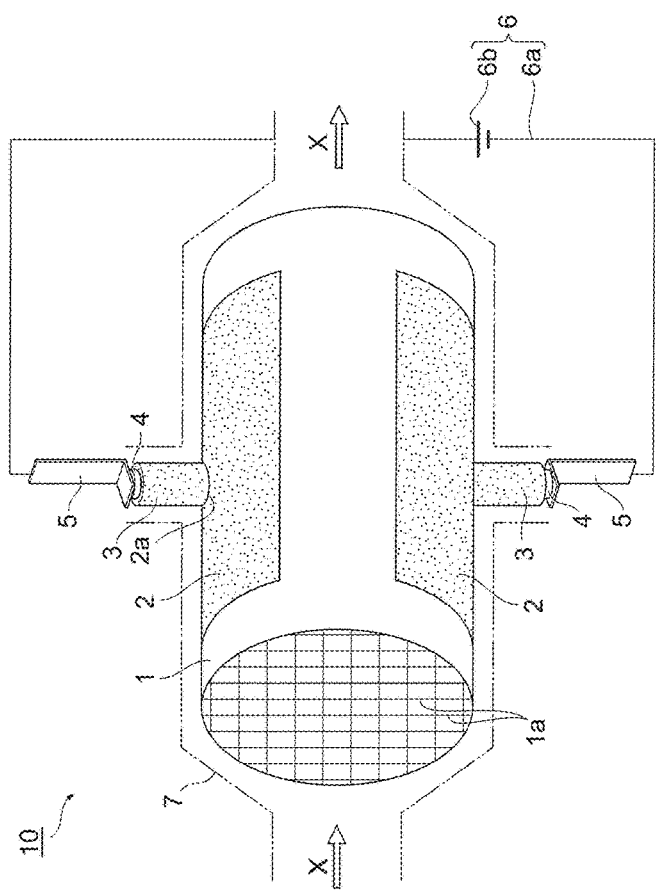
FIG. 1 is a schematic view illustrating an electrically-heated catalytic converter (EHC) according to an exemplary embodiment.

Hereinafter, an electrically-heated catalytic converter according to an exemplary embodiment will be described with reference to the accompanying drawings. An electrode terminal illustrated in the drawings has a three-layer structure. Alternatively, electrode terminals having a multi-layer structure other than a three-layer structure may be used, or electrode terminals having a gradually-varied thermal expansion coefficient instead of having a multi-layer structure may be used.

Figure 2A:
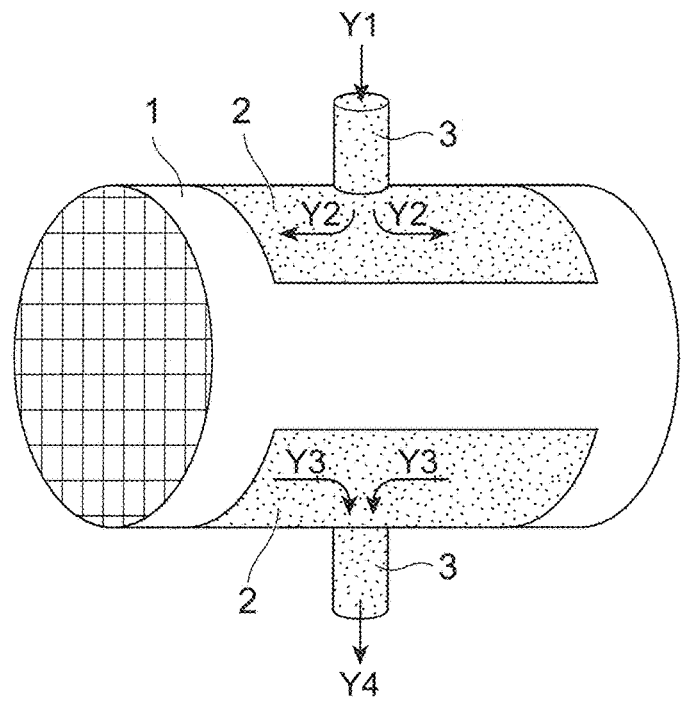
FIG. 2A is a perspective view illustrating the flow of applied electric current.
Figure 2B:
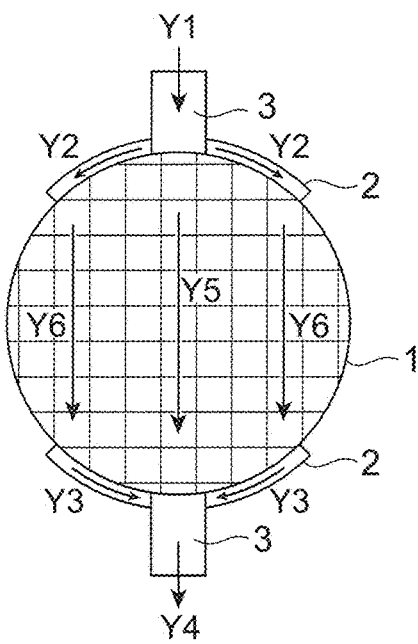
FIG. 2B is a cross-sectional view illustrating the flow of the applied electric current.
Figure 3:
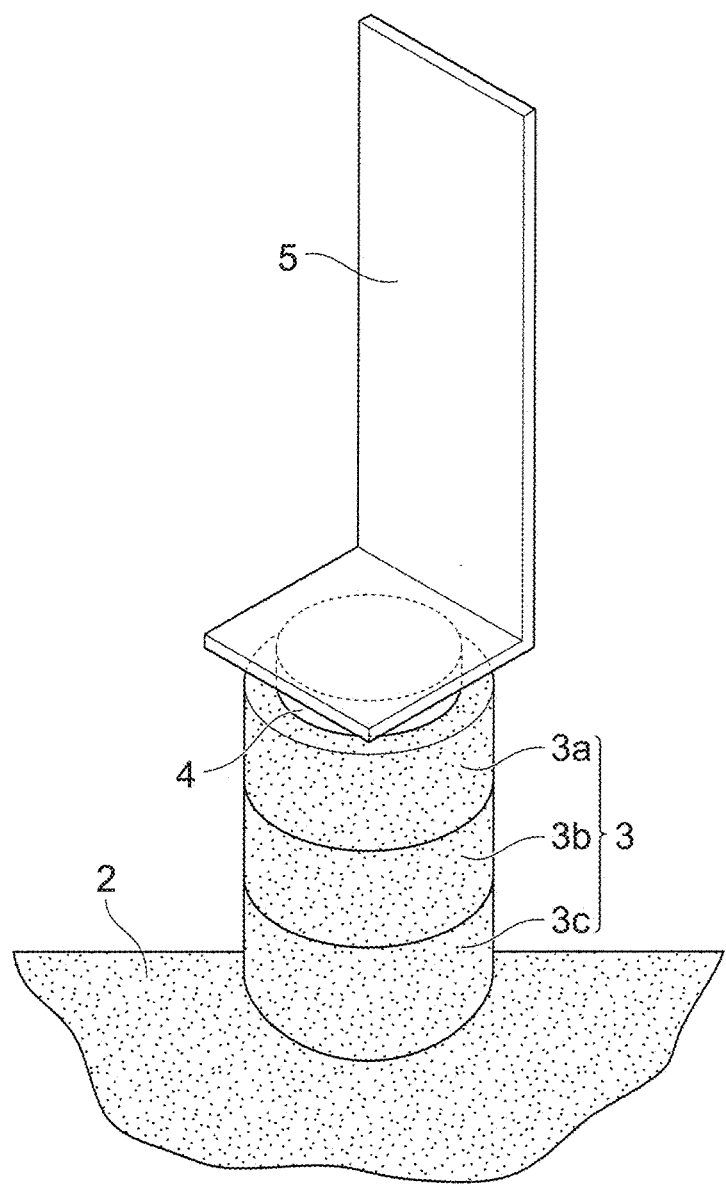
FIG. 3 is an enlarged view of an electrode terminal, a brazing filler metal, and an external electrode.

FIG. 1 is a schematic view illustrating an electrically-heated catalytic converter (EHC) according to an exemplary embodiment. FIG. 2A is a perspective view illustrating the flow of applied electric current. FIG. 2B is a cross-sectional view illustrating the flow of the applied electric current. FIG. 3 is an enlarged view of an electrode terminal, a brazing filler metal, and an external electrode.

An electrically-heated catalytic converter 10 illustrated in the drawings is configured to be incorporated in an exhaust system for exhaust gas, more specifically, in an exhaust system in which an engine (not illustrated), the electrically-heated catalytic converter (EHC) 10, a three-way catalytic converter (not illustrated), a sub-muffler (not illustrated), and a main-muffler (not illustrated) are disposed in this order and these components are connected to each other through a system pipe. When the engine is started, a precious metal catalyst included in the electrically-heated catalytic converter 10 is heated to a prescribed temperature as quickly as possible, and the exhaust gas flowing from the engine is cleaned by the precious metal catalyst. A portion of the exhaust gas that is not cleaned by the electrically-heated catalytic converter 10 is cleaned by the three-way catalytic converter disposed downstream of the electrically-heated catalytic converter 10.

The electrically-heated catalytic converter 10 mainly includes an outer pipe 7 made of metal (metal case), a substrate 1, electrode films 2, electrode terminals 3, external electrodes 5, and an external circuit 6. The substrate 1 is secured in a hollow space of the outer pipe 7 with a mat (holding member) (not illustrated) disposed between the substrate 1 and the outer pipe 7. The substrate 1 has a honeycomb structure, and has cell walls 1a. A catalyst coated layer (not illustrated) is formed on the surface of each cell wall 1a. The electrode films 2 are disposed on the surface of the substrate 1 to constitute a pair of electrodes. The electrode terminals 3 are disposed inside the electrode films 2. The external electrodes 5 are attached to the electrode terminals 3 via brazing filler metals 4. The external circuit 6 includes a cable 6a that connects the external electrodes 5 to each other, and an electric power source 6b disposed at an intermediate portion of the cable 6a.

The outer pipe 7 may have any tubular shape as long as the outer pipe 7 has a hollow space in which the substrate 1 having a heat-generating property is accommodated. For example, a cylindrical pipe, a square pipe, or a rectangular pipe may be employed depending on the shape of the substrate 1 to be accommodated therein.

The substrate 1 has exhaust gas passages defined by a plurality of the cell walls 1*a* constituting the honeycomb structure. The catalyst coated layer (not illustrated) is formed on each of the cell walls 1*a*. The catalyst coated layer is formed in the following manner. First, a platinum-group element, such as palladium (Pd), rhodium (Rh) or platinum (Pt), or a platinum-group element compound is supported on an oxide, such as alumina ($Al_2O_3$), or another precious metal or a compound containing another precious metal is supported on alumina or a ceria-zirconia-based composite oxide ($CeO_2$—$ZrO_2$). The resultant substance obtained as described above is mixed with an alumina sol and water to prepare slurry The slurry is applied onto a framework of the substrate by, for example, the impregnation method, the ion-exchange method, the sol-gel method, or the wash coat method. In this way, the catalyst coated layer is formed.

The exhaust gas from the upstream side of the exhaust system for exhaust gas (in the X direction) is cleaned by the activity of the precious metal catalyst while flowing through the exhaust gas passages defined by a plurality of the cell walls 1*a*. Then, the cleaned exhaust gas flows from the electrically-heated catalytic converter 10 toward the downstream side of the exhaust system.

A pair of upper and lower electrode formation regions is on the surface of the substrate 1. The electrode films 2 are disposed on the upper and lower electrode formation regions on the surface of the substrate 1. The electrode terminals 3 are secured to the surface of the substrate 1 through openings 2*a* provided in the electrode films 2.

The external electrodes 5 are attached to the electrode terminals 3 via the brazing filler metals 4. The cable 6*a* provided with the electric power source 6*b* is connected to the two external electrodes 5, that is, the upper and lower external electrodes 5, so that the external circuit 6 is formed.

As illustrated in FIG. 2A, when the electric power source 6*b* is turned on at the time of the engine starting, electric current is supplied to the electrode terminal 3 located at the center of the substrate 1, so that the electric current flows in the Y1 direction. As illustrated in FIG. 2B, the electric current flows through a first path along the Y5 direction and a second path along the Y2-Y6-Y3 direction and then flows in the Y4 direction, so that the electric current flows through the electrode terminal 3 that is located on the opposite side of the substrate 1 from the electrode terminal 3 to which the electric current is supplied from the electric power source 6*b*. On the first path, the electric current flows in the Y5 direction through a path along the diameter of the cross-section of the substrate 1. On the second path, the electric current flows in the Y2 direction through the electrode film 2 disposed around the electrode terminal 3, flows linearly in the Y6 direction in the cross-section of the substrate 1, and then flows in the Y3 direction through the electrode film 2 located on the opposite side of the substrate 1 from the electrode film 2 through which the electric current flows in the Y2 direction.

As described above, each electrode film 2 has an electric current diffusion function, and is configured to supply electric current throughout the substrate 1 as evenly as possible and to adjust the flow of electric current so as to evenly diffuse the electric current throughout the substrate 1.

The insulating mat (not illustrated) interposed between the outer pipe 7 and the substrate 1 may be formed of a ceramic fiber sheet made of, for example, alumina having high heat resistance and high strength in addition to high insulation performance.

Next, with reference to FIG. 3, the configuration of the electrode terminal 3 will be described in detail, and the materials and thermal expansion coefficients of the components will be described.

The substrate 1, the electrode films 2, and the electrode terminals 3 are each made of a ceramic material, and are each formed of, for example, SiC, a composite material of SiC and Si, or a composite material of SiC and $MoSi_2$.

As illustrated in FIG. 3, the electrode terminal 3 has a three-layer structure composed of a first layer 3*a*, a second layer 3*b* and a third layer 3*c*, in this order from the brazing filler metal 4. The first layer 3*a* has the highest thermal expansion coefficient, and the thermal expansion coefficient decreases in the order of the second layer 3*b* and the third layer 3*c* (i.e., the third layer 3*c* has the lowest thermal expansion coefficient).

Each of the thermal expansion coefficient of the substrate 1 and the thermal expansion coefficient of the electrode film 2 is approximately $4\times10^{-6}/°C.$ to $5\times10^{-6}/°C.$, the thermal expansion coefficient of the brazing filler metal is $7\times10^{-6}/°C.$ to $10\times10^{-6}/°C.$, and the thermal expansion coefficient of the external electrode 5 is $9\times10^{-6}/°C.$ to $12\times10^{-6}/°C.$ With regard to the thermal expansion coefficients of the layers constituting the electrode terminal 3, the thermal expansion coefficient of the third layer 3*c* is approximately $5\times10^{-6}/°C.$ to $6\times10^{-6}/°C.$, the thermal expansion coefficient of the second layer 3*b* is approximately $6\times10^{-6}/°C.$ to $8\times10^{-6}/°C.$, and the thermal expansion coefficient of the first layer 3*a* is approximately $8\times10^{-6}/°C.$ to $9\times10^{-6}/°C.$ When the second layer 3*b* and the first layer 3*a* are regarded as an "electrode terminal on the brazing filler metal side", the thermal expansion coefficient of a region corresponding to the electrode terminal on the brazing filler metal side is $6'310^{-6}/°C.$ to $9\times10^{-6}/°C.$, and is substantially equal to the thermal expansion coefficient of the brazing filler metal 4, which is $7\times10^{-6}/°C.$ to $10\times10^{-6}/°C.$, or the difference in thermal expansion coefficient between the electrode terminal on the brazing filler metal side and the brazing filler metal 4 is significantly small.

When the third layer 3*c* is regarded as an "electrode terminal on the electrode film side", the thermal expansion coefficient of a region corresponding to the electrode terminal on the electrode film side is approximately $5\times10^{-6}/°C.$ to $6\times10^{-6}/°C.$, and is substantially equal to the thermal expansion coefficient of the electrode film 2, which is approximately $4\times10^{-6}/°C.$ to $5\times10^{-6}/°C.$, or the difference in thermal expansion coefficient between the electrode terminal on the electrode film side and the electrode film 2 is significantly small.

The electrode terminal 3 has the three-layer structure and the thermal expansion coefficient is varied in the electrode terminal 3. Thus, the thermal expansion coefficient of the electrode terminal 3 is substantially equal to each of the thermal expansion coefficients of the electrode film 2 and the brazing filler metal 4 to which the electrode terminal 3 is connected, or the difference in thermal expansion coefficient between the electrode terminal 3 and each of the electrode film 2 and the brazing filler metal 4 is small. As a result, it is possible to effectively reduce the occurrence of damages to an interface between the adjacent components of the electrically-heated catalytic converter 10 due to a difference in thermal expansion coefficient (a difference in thermal deformation) between the adjacent components.

With regard to the thicknesses of each layer of the electrode terminal 3, the thickness of the first layer 3*a* may be set to approximately 0.8 mm or less, the thickness of the second layer 3*b* may be set to approximately 0.7 mm or less, and the thickness of the third layer 3c may be set to approximately 1.3 mm or less.

The difference in thermal expansion coefficient between the electrode film 2 and the electrode terminal 3 and the difference in thermal expansion coefficient between the electrode terminal 3 and the brazing filler metal 4 are each $2\times10^{-6}$ or less, and may be set to $1\times10^{-6}$ or less. Further, these differences in thermal expansion coefficient may be reduced to zero.

The brazing filler metal 4 may be made of a brazing filler metal composed of a material that contains Ti as a basic component and further contains, for example, Cu, Ni, Zr, Cr, or Al, or may be made of a clad-type Ti-based brazing filler metal. Specific examples of the latter include a brazing filler metal (60Ti15Cu25Ni) in which a Ti layer is disposed at the center, a Ni layer is disposed as the outermost layer, and a Cu layer is disposed between the Ni layer and the Ti layer, and a brazing filler metal (40Ti20Zr20Cu20Ni) in which a Ni layer is disposed as the outermost layer and a Cu layer and a Zr layer are disposed between the Ni layer and the Ti layer.

Due to the presence of the Ni layer as the outermost layer, favorable wettability with respect to the external electrode 5 made of SUS is obtained. On the other hand, the thermal expansion coefficient and the Young's modulus of the outermost layer are high (thermal expansion coefficient: $13.4\times10^{-6}/°$ C., Young's modulus: 200 GPa), and it is therefore preferable that the outermost layer be as thin as possible. The Young's modulus of Cu is low (Young's modulus: 128 GPa), leading to relaxation of internal stress. However, the thermal expansion coefficient of Cu is high (thermal expansion coefficient: $16.5\times10^{-6}/°$ C.), and it is therefore preferable that the Cu layer also be as thin as possible.

Ti that is the basic component serves as a stress relaxation layer, because the thermal expansion coefficient of Ti is close to that of the first layer 3a of the electrode terminal 3 (thermal expansion coefficient: $8.6\times10^{-6}/°$ C.) and the Young's modulus of Ti is low (Young's modulus: 116 GPa). Furthermore, Ti has a high reactivity with ceramic, and the wettability is favorable. With regard to the thickness of such a clad-type Ti-based brazing filler metal 4, the thicknesses of each of the Ni layer and the Cu layer may be set to approximately 2 μm to 3 μm, and the thickness of the Ti layer may be set to approximately 32 μm to 38 μm.

The external electrode 5 is made of SUS (19Cr-2Mo-based), and the thermal expansion coefficient of the external electrode 5 is lower than that of the external electrode made of SUS (20Cr-5Al) in the related art. The thermal expansion coefficient of the external electrode 5 may be approximately equal to the thermal expansion coefficient of the brazing filler metal 4.

The inventors produced an electrode terminal having a three-layer structure by the following method. Then, the inventors produced an electrically-heated catalytic converter according to an exemplary embodiment by connecting the electrode terminal and an external electrode with a brazing filler metal.

A process of producing an electrode terminal made of a MoSi$_2$/Si-based material, having a prescribed shape, and having a multi-layer structure will be described below. The process includes preparing base powder, making slurry from the base powder, making dry powder from the slurry through spray drying, forming layers, degreasing the formed article, and performing sintering.

First, MoSi base powder having a mean particle diameter D50 of several micrometers (for example, approximately 6 μm) and Si base powder having a mean particle diameter D50 of several micrometers (for example, approximately 8 μm) were each weighted by a prescribed amount, so that components for a multi-layer structure are obtained. Then, homogeneous mixed powder was prepared.

Then, slurry was prepared by adding an organic binder (for example, PVA) to the prepared mixed powder and mixing the resultant substance into water that serves as a solvent.

From the prepared slurry, spherical granulated powder having a component ratio of the multi-layer structure and having a mean particle diameter D50 of approximately 50 μm was prepared by a spray dryer under prescribed conditions.

From the prepared granulated powder, layers were pre-formed. For each layer, a prescribed amount of powder was placed into a press-forming die. Then, the layers were pre-formed sequentially from the lowest layer. After pre-forming of all the layers was completed, final forming was performed to produce an electrode terminal.

The formed article was degreased to remove the organic binder. Degreasing was performed under a reduced-pressure atmosphere and in a temperature range of approximately 300° C. to 600° C.

The formed article after degreasing was sintered to obtain a sintered body. Sintering was performed under an inert atmosphere and at a temperature close to the melting point (1414° C.) of Si. The sintered body was obtained through melting of Si.

The electrode terminal and the external electrode were connected to each other in the following manner. First, a prescribed amount of brazing filler metal in the form of foil was interposed between the ceramic electrode terminal having a multi-layer structure, which was produced as described above, and an external electrode made of SUS. When the adhesion between the brazing filler metal and the electrode terminal or the external electrode is insufficient, it is preferable that temporary joining be performed using an organic adhesive. When a brazing filler metal paste containing an organic binder is used, temporary joining can be performed using the paste itself.

The electrode terminal and the external electrode were connected to each other via the brazing filler metal by being exposed to a vacuum atmosphere or an inert atmosphere (Ar gas) at a prescribed brazing temperature (900° C. to 1000° C.) for a prescribed period of time. The brazing time is a period of time that is set by confirming that the brazing filler metal melts and diffuses to an upper portion of the electrode terminal.

Figure 4A:
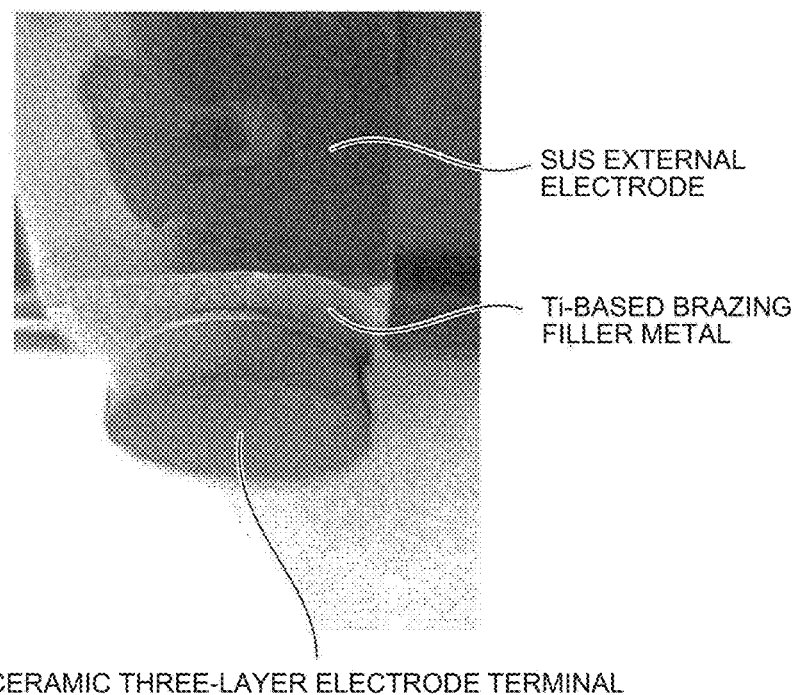
FIG. 4A is a photograph illustrating an enlarged image of an electrode terminal, a brazing filler metal, and an external electrode according to an exemplary embodiment.
Figure 4B:
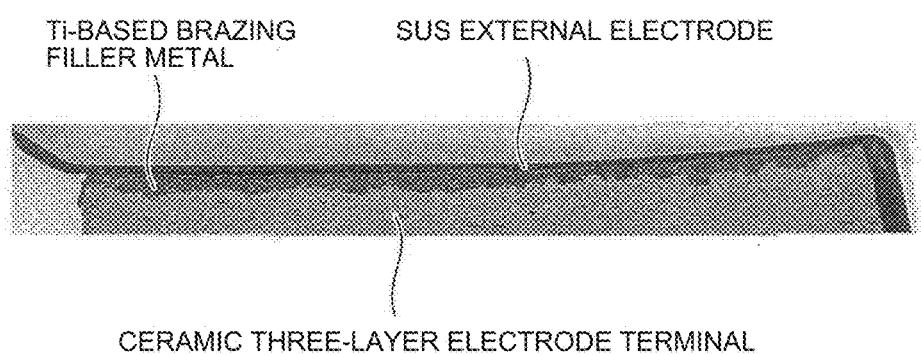
FIG. 4B is a photograph illustrating an enlarged image of a joint at which the electrode terminal and the external electrode are joined together by the brazing filler metal.

FIG. 4A is a photograph illustrating an enlarged image of the electrode terminal, the brazing filler metal, and the external electrode according to an exemplary embodiment. FIG. 4B is a photograph illustrating an enlarged image of a joint at which the electrode terminal and the external electrode are joined together by the brazing filler metal. FIG. 4A and FIG. 4B indicate that the brazing filler metal is sufficiently diffused to the upper surface of the electrode terminal. Thus, it is possible to form a layer having a thermal expansion coefficient intermediate between the thermal expansion coefficient of the brazing filler metal and the thermal expansion coefficient of the upper layer of the electrode terminal. Thus, it is possible to reliably join the electrode terminal and the brazing filler metal together.

The electrically-heated catalytic converter was produced in the following manner. First, a ceramic paste having a composition for an electrode film was applied, through screen printing, on a ceramic honeycomb substrate (SiC/Si) after sintering. Ceramic electrode terminals (MoSi$_2$/Si) after sintering were temporarily bonded onto the paste applied onto the substrate through screen printing, and then sintering was performed under an inert gas atmosphere (e.g. Ar gas) within a temperature range of approximately 1250° C. or higher. Then, Ti-based brazing filler metals were interposed between SUS external electrodes and upper layers of the ceramic electrode terminals having a multi-layer structure, and then brazing was performed under an inert gas atmosphere at a temperature of approximately 900° C. to 1000° C. Then, assembly was performed by a method for canning an ordinary catalytic substrate. In this way, the electrically-heated catalytic converter according to the example was produced.

Figure 5:
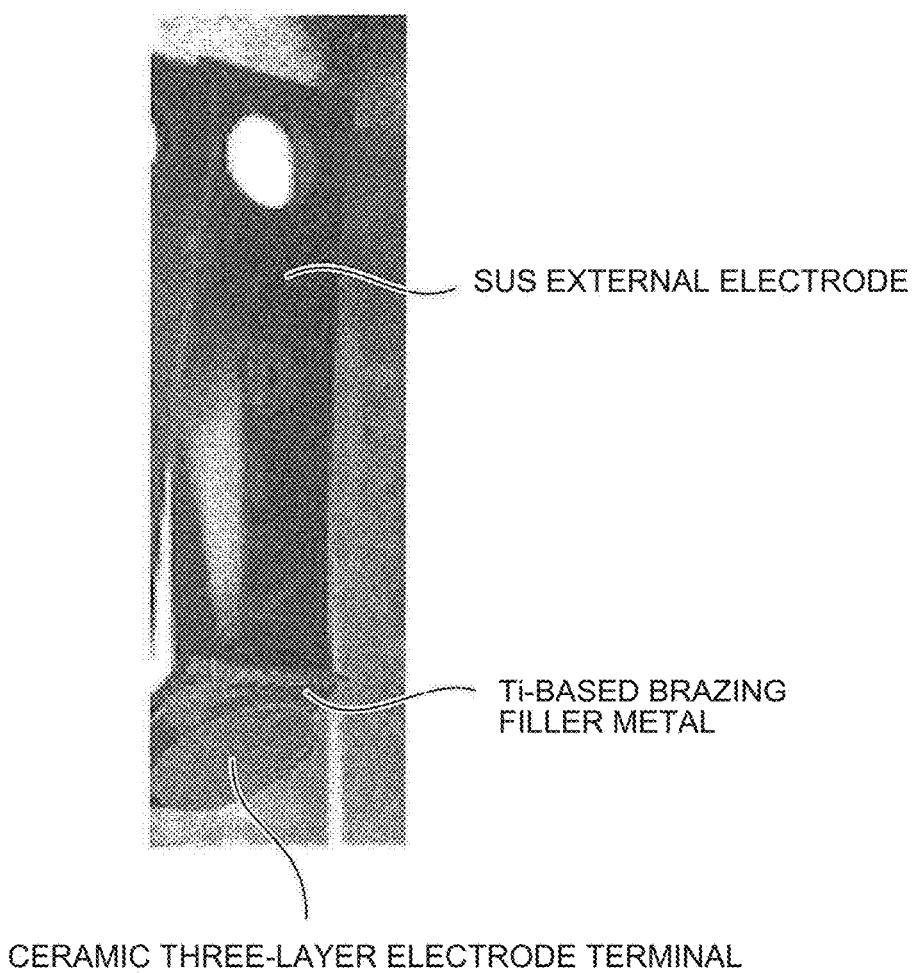
FIG. 5 is a photograph illustrating an image of the electrode terminal, the brazing filler metal, and the external electrode after a durability test.

Next, a durability test performed after a cooling-heating cycle test and the results of the durability test will be described. The inventors experimentally produced the electrically-heated catalytic converter in which the electrode terminals produced by the above-described method and the external electrodes are connected to each other via the brazing filler metals, and then performed a cooling-heating cycle test in which a cooling atmosphere at 200° C. and a heating atmospheres at 850° C. were repeated under an oxidation atmosphere. After the cooling-heating cycle test, a durability test (thermal shock test) was performed, and the state of connection between the electrode terminal and the external electrode via the brazing filler metal was checked. FIG. 5 is a photograph illustrating an image of the electrode terminal, the brazing filler metal, and the external electrode after the durability test.

FIG. 5 indicates that the connection between the electrode terminal and the external electrode via the brazing filler metal was maintained even after the thermal shock test.

While an exemplary embodiment has been described in detail with reference to the drawings, the exemplary embodiments are not limited to the ones described herein. For example, design changes may be made as needed within the scope of the invention.

What is claimed is:

1. An electrically-heated catalytic converter comprising:
    a substrate made of ceramic, the substrate including a catalyst coated layer;
    electrode films made of ceramic, the electrode films being disposed on a surface of the substrate;
    electrode terminals made of ceramic, each of the electrode terminals being secured to a corresponding one of the electrode films; and
    external electrodes each attached to a corresponding one of the electrode terminals via a brazing filler metal, wherein
    a thermal expansion coefficient of the brazing filler metal is equal to or higher than a thermal expansion coefficient of the electrode terminals, and is equal to or lower than a thermal expansion coefficient of the external electrodes, and
    a thermal expansion coefficient of each of the electrode terminals at a portion at which the electrode terminal is joined to the brazing filler metal is greater than a thermal expansion coefficient of the electrode terminal at a portion at which the electrode terminal is joined to the corresponding electrode film.

2. The electrically-heated catalytic converter according to claim 1, wherein:
    the thermal expansion coefficient of each of the electrode terminals at the portion at which the electrode terminal is joined to the brazing filler metal is between $6\times10^{-6}/°$ C. and $9\times10^{-6}/°$ C.;
    the thermal expansion coefficient of the brazing filler metal is between $7\times10^{-6}/°$ C. and $10\times10^{-6}/°$ C.; and
    the thermal expansion coefficient of the external electrodes is between $9\times10^{-6}/°$ C. and $12\times10^{-6}/°$ C.

3. The electrically-heated catalytic converter according to claim 1, wherein:
    a difference between the thermal expansion coefficient of each of the electrode terminals at the portion at which the electrode terminal is joined to the brazing filler metal and the thermal expansion coefficient of the brazing filler metal is $2\times10^{-6}$ or less; and
    a difference between the thermal expansion coefficient of the brazing filler metal and the thermal expansion coefficient of the external electrodes is $2\times10^{-6}$ or less.

4. The electrically-heated catalytic converter according to claim 1, wherein:
    the brazing filler metal is a Ti-based brazing filler metal; and
    a thermal expansion coefficient of the Ti-based brazing filler metal is between $9\times10^{-6}/°$ C. and $10\times10^{-6}/°$ C.

5. The electrically-heated catalytic converter according to claim 1, wherein each of the electrode terminals has a multi-layer structure including a plurality of layers each having a different thermal expansion coefficient.

6. The electrically-heated catalytic converter according to claim 1, wherein the external electrodes are made of 19Cr-2Mo Steel-Use-Stainless or 20Cr-5Al Steel-Use-Stainless.

7. A catalytic converter electrode assembly, comprising:
    a substrate comprising a coated catalyst layer and a precious metal catalyst;
    an electrode film provided on a surface of the substrate;
    an electrode terminal in electrical connection with the electrode film;
    an external electrode in electrical connection with the electrode terminal; and
    a brazing filling metal provided at an interface between the electrode terminal and the external electrode,
    wherein the electrode terminal is characterized by a non-uniform thermal expansion coefficient.

8. The catalytic converter electrode assembly of claim 7, wherein a portion of the electrode terminal adjacent to the substrate has a thermal expansion coefficient greater than a thermal expansion coefficient of the substrate, and wherein a portion of the electrode terminal adjacent to the external electrode has a thermal expansion coefficient greater than the portion of the electrode terminal adjacent to the substrate and equal to or less than a thermal expansion coefficient of the external electrode.

9. The catalytic converter electrode assembly of claim 7, wherein the substrate and the electrode film comprise an opening formed therein, and wherein the electrode terminal is secured to the substrate through the opening.

10. The catalytic converter electrode assembly of claim 9, wherein the electrode terminal comprises a multi-layer structure, comprising a first layer adjacent to the substrate and a second layer adjacent to the external electrode, wherein the first layer is characterized by a first thermal expansion coefficient, and the second layer is characterized by a second thermal expansion coefficient different than the first thermal expansion coefficient.

11. The catalytic converter electrode assembly of claim 10, wherein the first thermal expansion coefficient is a greater a thermal expansion coefficient of the substrate, and wherein the second thermal expansion coefficient is greater than the first thermal expansion coefficient and is equal to or less than a thermal expansion coefficient of the external electrode.

12. The catalytic converter electrode assembly of claim 11, wherein the electrode terminal further comprises a third layer in between the first layer and the second layer characterized by a third thermal expansion coefficient, and wherein the third thermal expansion coefficient is between the first thermal expansion coefficient and the second thermal expansion coefficient.

13. The catalytic converter electrode assembly of claim 12, wherein the thermal expansion coefficient of the substrate is between $4\times10^{-6}/^\circ$ C. and $5\times10^{-6}/^\circ$ C.

14. The catalytic converter electrode assembly of claim 13, wherein the thermal expansion coefficient of the external electrode is between $9\times10^{-6}/^\circ$ C. and $12\times10^{-6}/^\circ$ C.

15. The catalytic converter electrode assembly of claim 14, wherein the first thermal expansion coefficient is between $5\times6^{6}/^\circ$ C. and $6\times10^{-6}/^\circ$ C., wherein the second thermal expansion coefficient is between $8\times10^{-6}/^\circ$ C. and $9\times10^{-6}/^\circ$ C.; and the third thermal expansion coefficient is between $6\times10^{-6}/^\circ$ C. and $8\times10^{-6}/^\circ$ C.

16. The catalytic converter electrode assembly of claim 15, wherein a thermal expansion coefficient of the brazing filler metal is between $7\times10^{-6}/^\circ$ C. and $10-10^{-6}/^\circ$ C.

17. The catalytic converter electrode assembly of claim 16, wherein the brazing filler metal comprises Ti and at least one of Cu, Ni, Zr, Cr and Al, and wherein the thermal expansion coefficient of the brazing filler metal is between $9\times10^{-6}/^\circ$ C. and $10\times10^{-6}/^\circ$ C.

18. The catalytic converter electrode assembly of claim 17, wherein the external electrode comprises stainless steel.

19. The catalytic converter electrode assembly of claim 18, wherein the opening is a first opening, the electrode terminal is a first electrode terminal, and the external electrode is a first external electrode, and further comprising a second electrode terminal secured to the substrate through a second opening formed therein and a second external electrode in electrical connection with the second electrode terminal.

20. The catalytic converter electrode assembly of claim 19, further comprising an electric circuit connecting the first external electrode with the second external electrode.

* * * * *